United States Patent [19]
Yoshioka et al.

[11] 3,922,286
[45] Nov. 25, 1975

[54] PROCESS FOR THE PRODUCTION OF OPTICALLY ACTIVE DIHYDROCHRYSANTHEMOLACTONE

[75] Inventors: Hirosuke Yoshioka; Akio Higo, both of Ikeda; Hajime Hirai, Tokyo; Nobushige Itaya, Ikeda, all of Japan

[73] Assignee: Sumitomo Chemical Company, Limited, Osaka, Japan

[22] Filed: Mar. 14, 1972

[21] Appl. No.: 234,660

[30] Foreign Application Priority Data
Mar. 23, 1971 Japan.............................. 46-17019

[52] U.S. Cl. ............................................ 260/343.2
[51] Int. Cl.² ...................................... C07D 311/94
[58] Field of Search........................ 260/343.2, 343.6

[56] References Cited
UNITED STATES PATENTS
3,529,022  9/1970  Nakamoto et al. .............. 260/343.6
3,732,255  5/1973  Nabeta et al. ................... 260/343.6

*Primary Examiner*—Donald G. Daus
*Assistant Examiner*—Anne Marie T. Tighe
*Attorney, Agent, or Firm*—Stevens, Davis, Miller & Mosher

[57] ABSTRACT

Optically active dihydrochrysanthemolactone is obtained by means of optical resolution of (±)-dihydrochrysanthemolactone by adding as seed crystals optically active dihydrochrysanthemolactone to an organic solvent solution saturated or supersaturated with the racemic lactone, and is useful as an intermediate for the production of optically active chrysanthemic acid.

8 Claims, No Drawings

PROCESS FOR THE PRODUCTION OF OPTICALLY ACTIVE DIHYDROCHRYSANTHEMOLACTONE

This invention relates to a method for preparing optically active dihydrochrysanthemolactones of the formula (I).

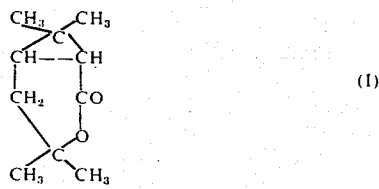

More particularly, the invention pertains to a method in which (±)-dihydrochrysanthemolactone is subjected to such specific recrystallization process to optionally obtain individual optical antipodes thereof, i.e. (+)-and/or (−)-dihydrochrysanthemolactones.

The (±)-dihydrochrysanthemolactone and optical antipodes thereof are known substances obtained for the first time by S. H. Harper et al. [J. Sci. Food and Agric. 3 233 (1952)], but the detailed physical properties thereof other than such fundamental data as melting points, optical rotations, etc. are unknown from the literature. Even when said (±)-dihydrochrysanthemolactone is subjected to recrystallization according to an ordinary procedure, there is recovered no other substance than the starting material, i.e. the racemic lactone. Alternatively, even when a solution of the (±)-dihydrochrysanthemolactone is seeded with seed crystals of either one of said optical antipodes, there is recovered no other substance than the racemic lactone, as well, if the solution is in a highly supersaturated state.

Surprisingly, however, the present inventors have found that when an appropriate seeding is effected under such specific conditions as mentioned later, a saturated or supersaturated racemic lactone solution in a suitable solvent deposits optically pure antipodes as crystals, which can be isolated by filtration, decantation or the like procedure. In concept, it may be said that such optical resolution process as mentioned above corresponds to the first process of the Pasteur's optical resolution method. Generally, however, said process is hardly successful. Further, no successful results could be obtained at all when attempts similar to the above-mentioned process were applied to a group of (±)-dihydrochrysanthemolactonerelated derivatives, e.g. (±)-cis-chrysanthemic acid (II) and (±)-trans-chrysanthemic acid (III).

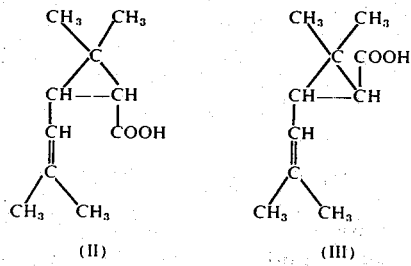

In other words, the inventors have found that among the said homologues, (±)-dihydrochrysanthemolactone exhibits exceptional behaviors.

For optical resolution of cis- and trans-chrysanthemic acids, there has been known only resolution processes belonging to the so-called Pasteur's second process in which the individual acids are formed into diastereomers by use of optically active amines, and the difference in physical properties between the two is utilized.

In practicing the method of the present invention, it is necessary to select a suitable solvent, which includes paraffinic hydrocarbons such as n-hexane, cyclohexane, petroleum ether, ligroin, etc.; aromatic hydrocarbons such as benzene, toluene, xylene, etc.; monoterpene hydrocarbons such as $\Delta^3$-carene, $\alpha$- and $\beta$-pinenes, etc.; halogenated hydrocarbons such as carbon tetrachloride, tetrachloroethane, etc.; many polar solvents containing water such as hydrous methanol, hydrous ethanol, etc.; and mixtures of water with acetone and the like; and a mixture thereof. It is favorable from industrial point of view to use as the solvent n-hexane, petroleum ether, $\Delta^3$-carene or a mixture thereof with other organic solvents mentioned above, such as said aromatic hydrocarbons. In this case, the concentration of (±)-dihydrochrysanthemolactone solution in the above-mentioned solvent is of particular importance, and it is necessary that the solution is in a state saturated or appropriately supersaturated with the racemic lactone at a temperature, at which the seeding is effected. The method of the present invention may be carried out at a temperature in the range from −30° to +60°C., but is ordinarily effected at about room temperature. After dissolving (±)-dihydrochrysanthemolactone in the aforesaid solvent to a proper concentration as mentioned above, the resulting solution is kept at a practice temperature. Thereafter, seed crystals of (+)- or (−)-optical antipode are seeded into the solution according to such a procedure as not to vigorously disturb the system. In this case, the seed crystals are not always required to be those of one antipode. That is, seed crystals of both (+)- and (−)-antipodes may be simultaneously seeded at properly distanced zones in one system. The amount of the seed crystals is not critical in the present process and depends on how the seeding is effected. It is desirous to use the seed crystals of high optical purity as possible. A catalytic amount of the seed crystals is sufficient to begin and proceed with the optical resolution, but any of more than catalytic amount of seed crystals is also applicable to the present invention.

The process of the present invention may be conducted most advantageously in a quasistable state. The term "quasistable state" will be illustrated below with reference to one case, where n-hexane is used as the solvent. The racemic lactone is dissolved in n-hexane at an optionally elevated temperature higher than 25°C in an amount of more than about 7 % by weight, which is the saturation solubility of the racemic lactone in n-hexane at 25°C, and thereafter the resulting solution is cooled to and maintained at 25°C. Then, the seed crystals are added thereto while being stirred disorderly, whereby the crystals are deposited to make the concentration 7 %. In case where the seed crystals of either racemic or optically active lactone are added to a solution having the concentration of more than 10 % by weight at 25°C, the racemic crystals are mainly deposited to make the concentration 7 % regardless the flowing state of the solution. On the other hand, when the racemic seed crystals are added to a solution having the concentration of between 7 % and 10 % by weight, no crystallization occurs in spite of the system of supersaturation as far as the solution is allowed to stand quietly or to be stirred gently, but the addition of the optically active seed crystals induces the crystallization of corresponding optically active crystals. This state is caused by the difference of saturation solubilities of the racemic lactone and the optically active lactone, and is called as the quasistable state. In the present invention, it is favorable to seed each (+)- and (−)-antipodes simultaneously at properly distanced zones in one system, because the seeding of only one antipode causes a higher concentration of the other antipode relative to the concentration of the one antipode, and when such unbalance of the concentrations exceeds a certain degree, the other antipode is apt to abruptly crystallized. Thus, (+)- and (−)-antipodes are crystallized with lowering the concentration of the racemic lactone in the remained mother liquor, thereby to reach around the saturation concentration. Then, the (+)- and (−)-antipodes may be taken respectively out of the system, and thereafter the racemic lactone may be added to said remained mother liquor at an elevated temperature to repeat the procedure mentioned above. Alternatively, the remained mother liquor may be placed again in the quasistable state mentioned above by lowering the temperature of the solution, thereby to continue the optical resolution.

The time required for the optical resolution of the present process depends on the practical conditions such as degree of saturation, temperature, nature of the solvent employed and the like, and is usually between 5 and 50 hours at a temperature of −30° to +60°C. The thus obtained (+)-dihydrochrysanthemolactone can be converted according to a known procedure with commercial advantages through a lower alkyl ester of (+)-cis-chrysanthemic acid into (+)-cis-chrysanthemic acid. As is well known, esters of (+)-cis-chrysanthemic acid with specific alcohols are widely applicable as insecticides which are markedly excellent in insecticidal activity. On the other hand, the (−)-dihydrochrysanthemolactone obtained in the above case is converted according to the aforesaid procedure into a lower alkyl ester of (−)-cis-chrysanthemic acid, which is then isomerized according to a known procedure to give stereospecifically a (+)-trans-chrysanthemic acid ester.

It has widely been known that (+)-trans-chrysanthemic acid is an intermediate essential for pyrethroid type insecticides which are low in toxicity to mammals and excellent in insecticidal activity against injurious insects.

The method of the present invention constitutes a part of theoretically excellent techniques for the commercial production of such useful optically active chrysanthemic acids as mentioned above. This is because every known process for the production of optically active chrysanthemic acids requires (i) the use of optically active amines and (ii) the racemization of antipodes which are none or less in usefulness, and hence has had great drawbacks when carried out on commercial scale.

The method of the present invention will be illustrated in detail with reference to the following examples, which are not intended to limit the scope of the present invention.

EXAMPLE 1

10 Grams of (±)-dihydrochrysanthemolactone (m.p. 51°C.) was dissolved at about 40°C in 10 times the volume thereof of n-hexane, and the resulting solution was allowed to cool to room temperature. Subsequently, a slight amount of purified seed crystals of (+)-dihydrochrysanthemolactone was added to the clear solution in such a manner as not to greatly disturb the solution, and the system was allowed to stand for 4 days to deposit a single crystals which had grown to several hundred times the size of the seed crystals. Thereafter, the single crystal was recovered by decantation to obtain 0.5 g. of an optically active substance, m.p. 80° − 82°C. From the optical rotation of the thus obtained substance, it was indentified that the substance was optically pure (+)-dihydrochrysanthemolactone.

EXAMPLE 2

216 Grams of (±)-dihydrochrysanthemolactone was charged into a 3 liter flask and dissolved at an elevated temperature in 1,800 g. of n-hexane, and the resulting solution was allowed to cool to room temperature with gentle stirring. On the other hand, purified seed crystals of (+)-dihydrochrysanthemolactone and (−)-dihydrochrysanthemolactone were respectively seeded to each of 2 separate deposition poles which were capable of being cooled by recycling cooling water therethrough, and then the poles were dipped in the racemic lactone solution. Subsequently, the poles were cooled by recycling water at 23°C. through the deposition poles, while maintaining the solution temperature at 26°C., and the solution was gently stirred as it was for 24 hours. Thereafter, the deposition poles were taken out of the solution and air-dried, and then the grown crystals were collected by scraping to obtain two kinds of optically active substances. The amounts of the thus obtained substances were individually 7 g., and the melting points thereof were individually 80° − 82°C. From the optical rotations of the thus obtained substances, it was identified that the substances were optically pure (+)-dihydrochrysanthemolactone and (−)-dihydrochrysanthemolactone.

EXAMPLE 3

Example 2 was repeated, except that the room temperature was maintained at 26° to 27°C. and the solution was gently stirred for a total of 41 hours while recycling through the deposition poles water at 23°C. for 19 hours and then water at 20°C. for 8 hours, to obtain each 23 g. of (+)- and (−)-dihydrochrysanthemolactones. The (+)-dihydrochrysanthemolactone showed a specific optical rotation at 25°C. of +70.34° (in chloroform; C=4.2), which corresponds to an optical purity of 92.6 %, while the (−)-dihydrochrysanthemolactone showed a specific optical rotation at 25°C. of −73.37° (in chloroform; C=5.2), which corresponds to an optical purity of 96.5 %.

The optical rotations of pure (+)- and (−)-dihydrochrysanthemolactones are + and −76.6° (in chloroform; C=5.0), respectively.

EXAMPLE 4

Example 2 was repeated except that 432 g. of (±)-dihydrochrysanthemolactone was dissolved in 1800 g. of a solvent consisting of n-hexane 9 : benzene 1, whereby each 12 g. of optically pure lactone was obtained.

What is claimed is:

1. A method for preparing optically active dihydrochrysanthemolactone, comprising the steps of optical resolution of (±)-dihydrochrysanthemolactone by adding as seed crystals optically active dihydrochrysanthemolactone to a solution at a temperature of −30° to 60°C of an organic solvent selected from the group consisting of paraffinic hydrocarbon, aromatic hydrocarbon, monoterpene hydrocarbon, halogenated hydrocarbon, a polar solvent mixed with water and mixtures thereof which is saturated or supersaturated with (±)-dihydrochrysanthemolactone, and allowing to stand the resulting mixture for 5 to 50 hours at a temperature of −30° to 60°C to deposit the optically active dihydrochrysanthemolactone.

2. A method according to claim 2, wherein the paraffinic hydrocarbon is n-hexane, cyclohexane, petroleum ether, ligroin, or a mixture thereof.

3. A method according to claim 2, wherein the aromatic hydrocarbon is benzene, toluene, xylene or a mixture thereof.

4. A method according to claim 2, wherein the monoterpene hydrocarbon is $\Delta^3$-carene, α-pinene, β-pinene or a mixture thereof.

5. A method according to claim 2, wherein the halogenated hydrocarbon is tetrachloromethane, tetrachloroethane or a mixture thereof.

6. A method according to claim 2, wherein the polar solvent to be mixed with water is methanol, ethanol or acetone.

7. A method according to claim 1, wherein (+)- or (−)-dihydrochrysanthemolactone is added to the organic solvent solution.

8. A method according to claim 1, wherein (+)- and (−)-dihydrochrysanthemolactones are simultaneously added to properly distanced zones of the organic solvent solution.

* * * * *